United States Patent [19]

Buckingham

[11] 4,106,363
[45] Aug. 15, 1978

[54] ANTI-ROLL RACK BAR
[75] Inventor: James Ernest Buckingham, Bristol, England
[73] Assignee: Cam Gears Limited, England
[21] Appl. No.: 699,720
[22] Filed: Jun. 25, 1976
[30] Foreign Application Priority Data
Jul. 7, 1975 [GB] United Kingdom .............. 28508/75
[51] Int. Cl.² ............................................. B02D 1/20
[52] U.S. Cl. .................................................... 74/498
[58] Field of Search ........................ 74/498; 308/3 A
[56] References Cited
U.S. PATENT DOCUMENTS
3,054,645 9/1962 Evans .................................. 308/3 A

FOREIGN PATENT DOCUMENTS
1,912,377 9/1970 Fed. Rep. of Germany ............ 74/498
2,001,478 8/1970 Fed. Rep. of Germany ............ 74/498

Primary Examiner—Benjamin W. Wyche
Assistant Examiner—Wesley S. Ratliff, Jr.

[57] ABSTRACT

A rack and pinion vehicle steering assembly includes a rack bar and a transmission bar slidable in a housing. A bearing straddles the transmission bar. A portion of the bearing carries a flat face which imposes on and is substantially in face-to-face contact with the second flat face on the transmission bar. The flat faces cooperate to resist turning movement of the transmission and rack bar in the housing.

14 Claims, 7 Drawing Figures

ANTI-ROLL RACK BAR

This invention relates to rack and pinion assemblies and is directed towards a rack and pinion assembly which is particularly suitable for use in a steering mechanism and of the type (hereinafter referred to as the type specified) which comprises a pinion rotatably mounted in a pinion housing, a rack bar linearly movable in a longitudinal direction through the pinion housing and restrained from substantially lateral displacement in said housing, a toothed rack on the rack bar which operatively engages with the pinion so that rotation of the pinion effects movement of the rack bar longitudinally through the housing, and wherein a transmission bar part extends longitudinally from one end of the rack bar to be movable therewith, laterally extending pin means being provided on the transmission bar part of the rack bar for coupling to transmission elements associated with the steering mechanism.

Rack and pinion assemblies of the type specified are known in the art as being "centre take-off," such term describing the general location of the coupling position on the assembly of the pin or pins to the transmission elements (which are usually, and will hereinafter be referred to as, tie rods) when the pinion is located substantially centrally on the toothed rack in the longitudinal direction thereof.

A rack and pinion assembly of the type specified is described in our Patent Specification Ser. No. 959,892 in which it is explained that because each tie rod associated with the steering mechanism is offset from the longitudinal axis of the rack bar, when a tire rod is attached at one of its ends to one of the afore-mentioned laterally extending pins and is coupled at its other end to a steerable road wheel, there is a tendency for a reaction from the road wheel through the tie rod to produce a turning movement about the longitudinal axis of the rack bar. This turning movement of the rack bar has been found to cause wear in the engaging teeth of the rack and pinion and it is an object of the present invention to provide a construction of rack and pinion assembly of the type specified which will substantially alleviate such turning movement of the rack bar.

According to the present invention there is provided a rack and pinion assembly of the type specified in which the rack bar and transmission bar part are slidable in a housing part, and wherein there is provided a bearing bush having slide portions which at least straddle the transmission bar part and an intermediate portion which is located between the transmission bar part and the housing part, the bearing bush being fixed relative to one of said parts and slidable relative to the other part, the intermediate portion of the bearing bush carrying a flat face which opposes and is substantially in face-to-face contact with a second flat face carried on the part relative to which the bearing bush is slidable, said flat faces co-operating to resist turning movement of the transmission bar part and rack bar in the housing part.

The bearing bush is thus located between the transmission bar part of the rack bar and the housing part and may provide support for and radial location of the transmission bar part in the housing part, as well as providing a flat face which co-operates with the second flat face to resist relative turning movement between the two parts. The bearing bush may be metallic, but preferably it will be made of a plastics material with a degree of resilience, as for example a polyurethane compound, which may be slightly compressed between the transmission bar part and the housing part. Where the bearing bush is formed of a resilient material, it may help to absorb any shock forces transmitted from the road wheels through the tie rods to the aforementioned laterally extending pin means.

The bearing bush may be fixed relative to the transmission bar part so that the rack bar and the bearing bush carried on the transmission bar part are slidable together within the housing part. In this embodiment of the invention the flat face carried on the bearing bush will be located on an outermost surface of the latter and the second flat face will be carried on the internal wall of the housing part. The side portions of the bearing bush may extend substantially fully around the periphery of the transmission bar part and thereby totally envelop a lateral portion of the transmission bar part. Conveniently the bearing bush is carried on substantially the same lateral portion of the transmission bar part that carries the laterally extending pin means.

Alternatively the bearing bush may be fixed relative to the housing part so that the transmission bar part of the rack bar is slidable in the bearing bush. In this alternative embodiment the flat face carried on the bush will be located on an innermost surface thereof which the second flat face is carried on the transmission bar part. In a preferred arrangement of this latter embodiment, the location of the bearing bush on the housing part is such that part of the periphery of substantially the same lateral portion of the transmission bar part that carries the laterally extending pin means is straddled by the bearing bush when the pinion is located substantially centrally, in the longitudinal direction, of the toothed rack. Where the bearing bush is fixed relative to the housing part at a position which in any relative position of the rack and pinion is remote from the laterally extending pin means, the side portions of the bush may extend fully around the transmission bar part which latter is slidable through the bush.

Either one of the flat faces may be of substantially less length than the other, as long as they are maintained in sliding engagement throughout the full length of travel of the toothed rack, and preferably it is the flat face carried by the bearing bush that is the shorter. Conveniently, but not essentially, the flat face carried by the bearing bush is of substantially the same length as the bush.

Both of the flat faces may comprise an integral part of the components by which they are carried, so that the bearing bush and the part relative to which it is slidable are in contact in a lateral plane including the flat faces. Alternatively the or each flat face may comprise part of a slipper member carried by the bearing bush and/or the part relative to which it is slidable. The or each slipper member may be inserted to reduce friction, for example, in the assembly and may comprise a plastics or metallic strip whose flat face may have a coating of a low friction material such as polytetrafluoroethylene. If only one slipper member is provided it is preferably carried by the bearing bush.

The part to which the bearing bush is fixed may be of any suitable cross-sectional shape that allows the flat face carried by the bearing bush to oppose the second flat face carried by the other part, relative to which the bush is slidable. Preferably, however, those portions of the transmission bar part and internal wall of the housing part in the lateral plane of the bearing bush have substantially similar cross-sectional configurations.

Thus, if, for example, the housing part generally has a substantially circular or oval internal cross-section and carries the second flat face so that the internal cross-section is substantially "D"-shaped in the lateral plane of the second flat face, the lateral portion of the transmission bar part to which the bearing bush is attached may also be substantially D-shaped with the straight backs of the 'D''s in opposed substantially face-to-face relationship and having located between them the intermediate portion of the bearing bush. Similarly, the transmission bar part may be formed from round stock which has a machined flat edge providing the second flat face and the lateral portion of the internal wall of the housing part to which the bearing bush is fixed may be of a corresponding cross-section.

Alternatively the part relative to which the bearing bush is slidable may be polygonally shaped in lateral cross-section, for example, square or triangular, and the lateral cross-section of that portion of the other part, to which the bush is fixed, may be of substantially corresponding shape.

In a further embodiment, and according to a further aspect of the present invention there is provided a rack and pinion assembly of the type specified in which the rack bar and transmission bar part are slidable in a housing part, and wherein a portion of the transmission bar part on the side of the laterally extending pin means remote from the pinion housing carries a first flat face, and the housing part carries an opposed second flat face substantially in face-to-face contact with the first flat face and which co-operates in longitudinally sliding engagement with the first flat face to resist turning movement of the transmission bar part, and rack bar in the housing part.

In the embodiment described in the immediately preceding paragraph, the engaging first and second flat faces are remote from the laterally extending pin means and from the engaging teeth of the rack and pinion, and may be subjected to relatively lesser shock forces transmitted from the road wheels through the tie rods to the laterally extending pin means than the previously described embodiments. Conveniently therefore this embodiment may be employed where economy is of importance.

Various embodiments of the present invention will now be described, by way of example only, with reference to the accompanying drawings, in which.

Where possible similar parts or members in each of the embodiments of the present invention hereinafter described will, for convenience, be provided with the same reference character.

Figures 1, 7:
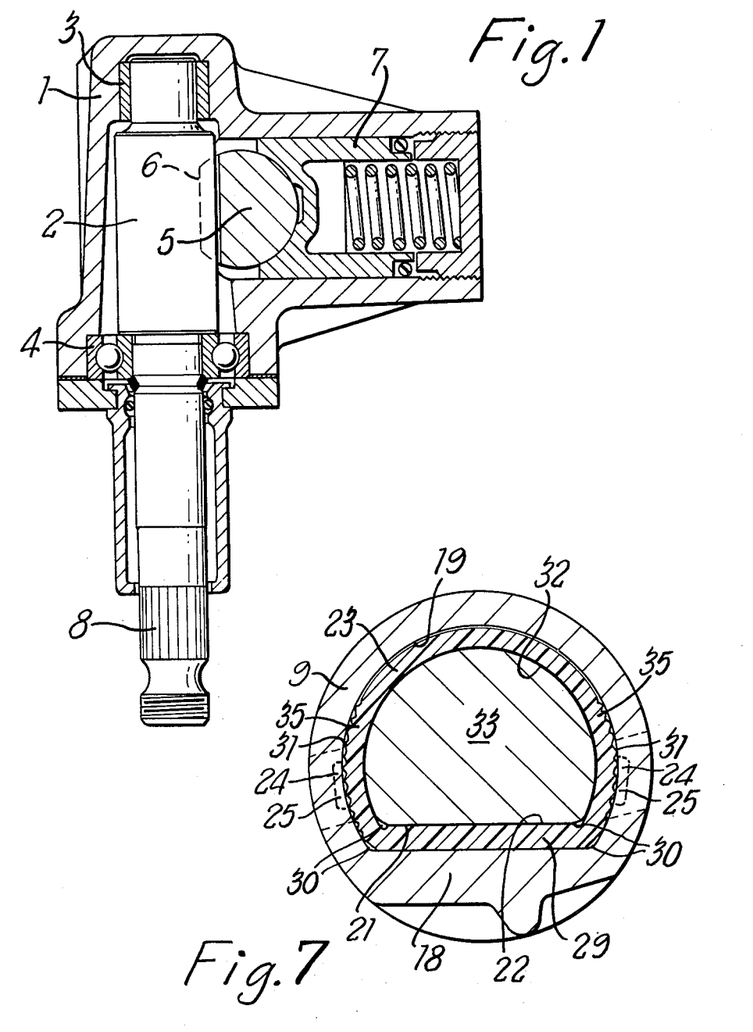
FIG. 1 is a section through a conventional form of pinion housing assembly which may be used in conjunction with any one of the following three embodiments of the invention illustrated.
FIG. 7 is a partial cross-section taken on the line VII—VII of FIG. 6.

FIG. 1 shows a conventional form of pinion housing assembly comprising a one-piece housing 1 which carries a pinion 2 rotatably mounted in bearings 3 and 4. A rack bar 5 is supported and restrained from substantially lateral displacement in the housing 1 by a spring-loaded yoke 7 so that a toothed rack 6 carried by the rack bar is urged into engagement with the teeth of the pinion. The pinion 2 has an input shaft 8 which is usually joined to a manually-operable steering wheel (not shown). Rotation of the input shaft 8 causes rotation of the pinion 2 which produces longitudinal movement of the rack bar 5 through the pinion housing 1.

Figure 2:
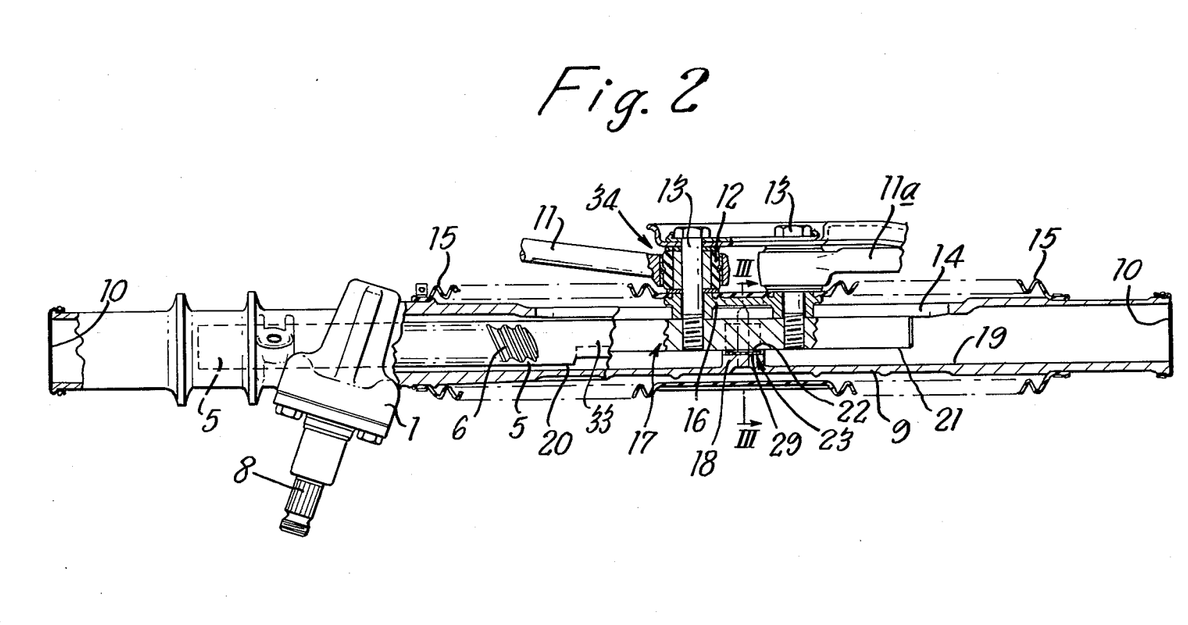
FIG. 2 is a part-sectional longitudinal view of a rack and pinion assembly incorporating a first embodiment of the invention.
Figure 4:
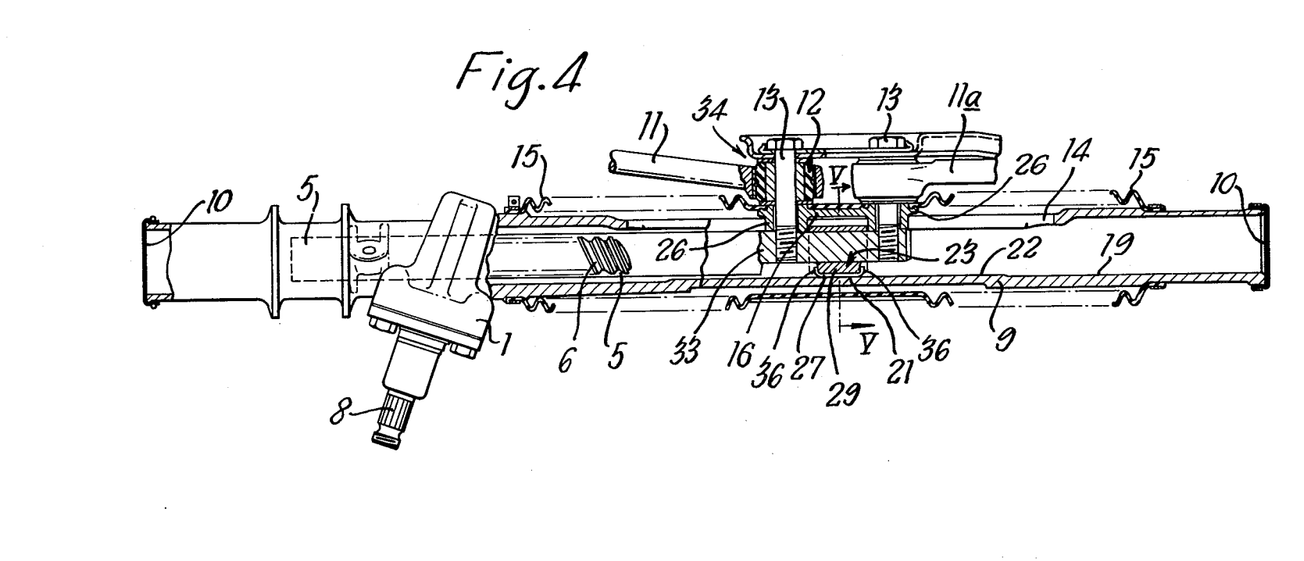
FIG. 4 is a part-sectional longitudinal view of a rack and pinion assembly incorporating a second embodiment of the invention.
Figure 6:
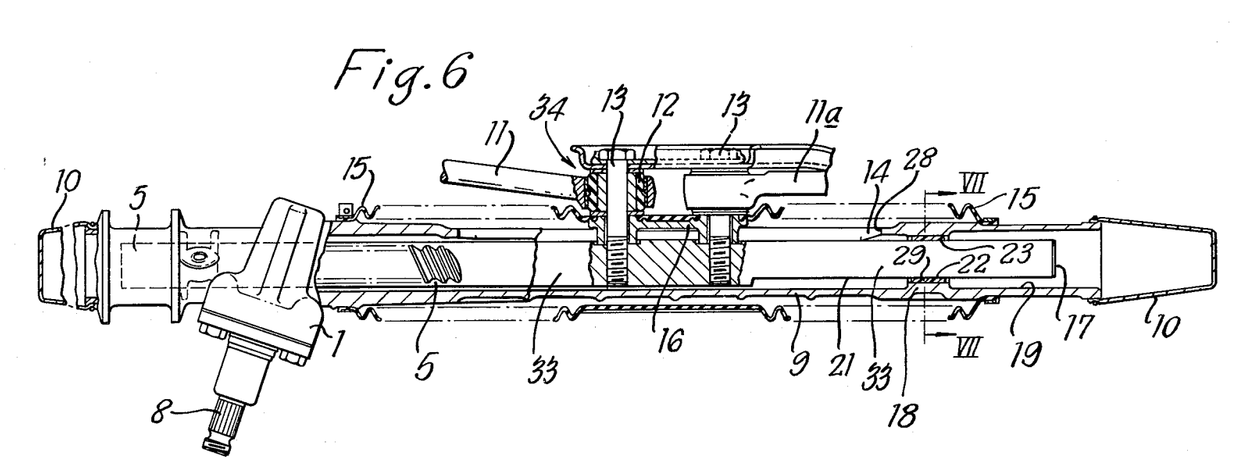
FIG. 6 is a part-sectional longitudinal view of a rack and pinion assembly incorporating a third embodiment of the invention.

Referring generally to FIGS. 2, 4 and 6, the rack bar 5 is slidable within a rack bar housing 9 which extends longitudinally from the pinion housing 1, and at either end of which is provided a cap 10. The caps 10 serve to seal the unit against dust and are removable for lubrication of the assembly. Steering transmission to the road wheels (not shown) is by way of tie rods 11 and 11a which are each articulatedly connected to a transmission bar part 33 of the rack bar 5 extending coaxially and rigidly of the latter, by way of pin means 34 comprising a resilient bush 12 and a pin or bolt 13. The bolts 13 are substantially parallel and screw-threadedly engage with the transmission bar part 33 on a common side thereof to project laterally therefrom through a common elongate slot 14 in the rack bar housing 9. The slot 14 is sealed against dust by a rubber bellows 15 surrounding the centre portion of the housing 9 and interconnecting the bolts and the housing 9. The pin means 34 further comprise a support plate 16 which links the two bolts 13 and with which the bellows 15 conveniently engages.

Figure 3:
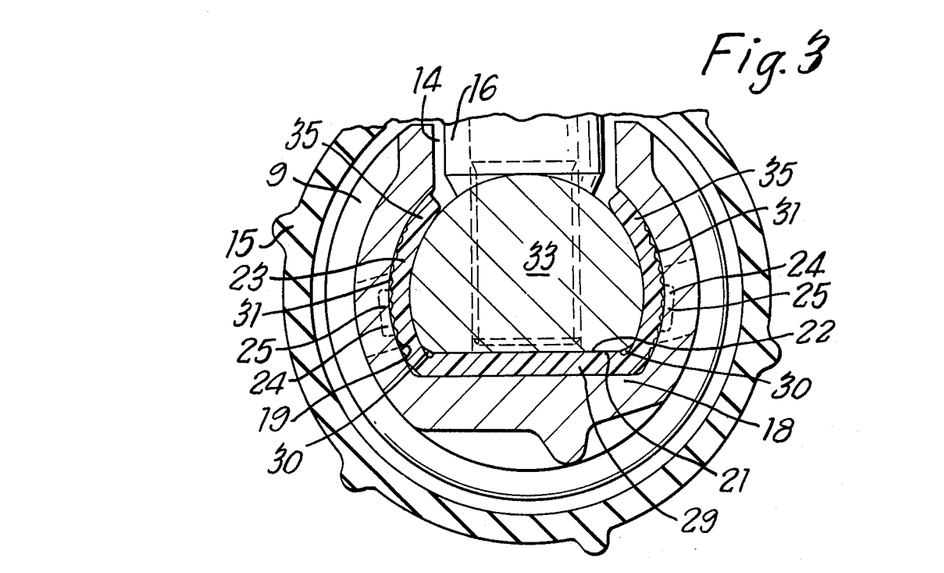
FIG. 3 is a partial cross-section taken on the line III—III of FIG. 2.

Referring particularly to FIGS. 2 and 3, the rack bar 5 is supported and radially located at its end 17 substantially comprising the transmission bar part 33 by a bearing bush 23 located on a relatively short projection 18 which extends laterally inwardly from the rack bar housing 9. A portion of side 20 of the substantially circular transmission bar part 33 opposite that side from which the bolts 13 extend is machined to provide a second flat face 21, so that a cross-section of the transmission bar part 33 including the second flat face 21 is substantially "D"-shaped. An intermediate portion 29 of the bearing bush 23 extends between the projection 18 and second flat face 21 and carries a first flat face 22 which co-operates with the second flat face 21 to resist turning movement of the transmission bar part 33 in the housing 9. A lateral cross-section through the housing part including the projection 18 is also substantially "D"-shaped, the "D" being interrupted by the slot 14.

The bearing bush 23 has side portions 35 which project from opposite ends of the intermediate portion 29, and which straddle part of the periphery of the transmission bar part 33. The bearing bush is fixed relative to the rack bar housing 9 and its side portions 35 carry protuberances 24 which engage with small slots 25 in the inner wall 19 of the housing 9. The projection 18 has a flat surface on which the intermediate portion of the bush is located, and the positioning of said flat surface is such that in an unstrained condition, the intermediate portion of the bush 23 has opposed parallel surfaces, one of which comprises the first flat face 22.

The second flat face 21 is of substantially the same length as the length of travel of the toothed rack 6 and is equally spaced longitudinally about the pin means 34.

The bearing bush 23 carrying the first flat face 22 and projection 18 to which it is fixed are substantially shorter and are positioned on the inner wall 19 of the rack bar housing 9 so that, when the road wheels (not shown) to which the tie rods 11 and 11a are connected are in the straight-ahead position, the bush is located centrally in the longitudinal direction of the pin means 34.

The bearing bush 23 is preferably made of a plastics material having a degree of resilience, for example polyurethane, and is preferably slightly compressed laterally between the transmission bar part 33 and the rack bar housing 9. Since the support plate 16 projects inwardly through the slot 14 to engage the transmission bar part 33 and moves longitudinally with the latter through the bush 23, the bush does not totally enclose the lateral section of the transmission bar part. To facilitate lubrication of the transmission bar part 33, there are provided corresponding relief channels 30 in the bush 23 and in the transmission bar part 33 which allow lubricant to pass. The outer surface 31 of each side portions 35 is corrugated to allow the passage of lubricant as well as assisting in maintaining the bush in position on the projection 18.

Figure 5:
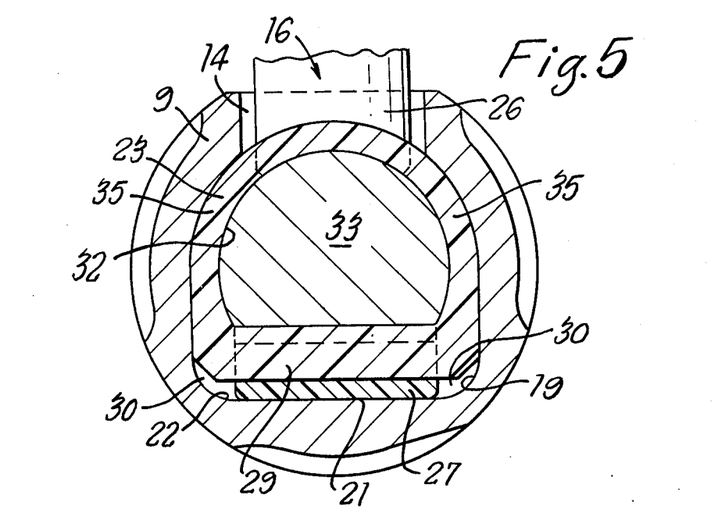
FIG. 5 is a partial cross-section taken on the line V—V of FIG. 4.

In the second embodiment shown in FIGS. 4 and 5, the resilient bearing bush 23 is fixedly attached to the transmission bar part 33 by wedging between two stops 26 of the support plate 16 so that the transmission bar part 33 and the bearing bush 23 may move longitudinally relative to the second flat face 22 formed on the inner wall 19 of the rack bar housing 9. The second flat face 22 is located opposite to the elongate slot 14 through which the pin means 34 project, and the portion of the substantially circular transmission bar part 33 on which the bush 23 is located has been machined to provide a substantially "D"-shaped cross-section for convenience.

A slipper 27 is wedged between the bearing bush 23 and second flat face 22 and is fixed relative to the bush by tab ends 36 which engage the bush. The slipper 27 may be formed of a plastics or metallic strip or moulding that helps to reduce friction in the assembly, and includes the first flat face 21 which is in face-to-face contact with the second flat face 22.

The second flat face 22 comprises the longer of the two flat faces and is of substantially equal length to the length of travel of the toothed rack 6. The bush 23 totally encloses the lateral portion of transmission bar part 33 on which it is located, the shape of the internal wall 32 substantially corresponding to the "D" cross-section of that portion of the transmission bar part. Lubrication of that length of the second flat surface 22 on the side of the slipper 27 remote from the pinion housing 1 is by way of relief channels 30.

By wedging the bush 23 between the two stops 26 and thereby ensuring that the co-operating flat faces maintain engagement with each other in a lateral plane of the transmission bar part 33 that includes the pin means 34 (through which the twisting force to the rack bar 5 is usually applied), resistance to the twisting force is at its maximum even when the road wheels to which the tie rods 11 and 11a are coupled are not in the straight-ahead position.

In the third embodiment shown in FIGS. 6 and 7, the transmission bar part 33 of the rack bar 5 has been extended longitudinally compared to the first and second embodiments, and is machined to provide the second flat face 21, on a portion of the transmission bar part opposite to the side from which the pin means 34 extend. The second flat face 21 extends from a position adjacent to the bolt 13 most remote from the pinion housing 1, to the end 17 of the rack bar 5. The end portions 10 of the rack bar housing 9 are cone shaped to accommodate the longer rack bar 5.

A projection 18 extends inwardly from inner wall 19 of the housing 9 at a position substantially adjacent to end 28 of the slot 14 remote from the pinion housing, and has fixedly attached thereto, by means of protuberances 24 which engage small slots 25, bearing bush 23 through which the portion of the transmission bar part 33 carrying the second flat face 21 may slide.

The bush 23 carries first flat face 22 in face-to-face contact with second flat face 21 and has side portions 35 which fully enclose the periphery of the lateral portion of the transmission bar part 33 about which the bush is located, and the shape of the internal wall 32 thereof corresponds substantially to the "D"-shaped cross-section of that lateral portion.

The bearing bush 23 is preferably compressed between the transmission bar part 33 and the protuberance 18, and lubrication of the portions of the transmission bar part on the side of the bush 23 remote from the pin means 34 is by way of relief channels 30 in the transmission bar part 33 and in the bush 23 and may also be by way of corrugations in the outer surface 31 of the bush.

In the embodiment shown in FIG. 6, the bearing bush 23, has been moved to a position more remote from the pinion housing 1 and the pin means 34 than in the first and second embodiments. For this reason there will generally be lesser forces acting between the co-operating flat faces, and, if required for reasons of economy or otherwise, the bush 23 may be omitted from the assembly, and the projection 18 may be extended laterally inwardly so that the inner wall 19 of the housing 9 surrounds and bears upon the transmission bar part in sliding engagement. In this alternative embodiment, the flat surface of the projection 18 will comprise the second flat face 21 and will be in face-to-face contact with the first flat face 22 to resist turning movement of the transmission bar part 33 in the housing 9.

Alternatively, and for the same reasons, the bush 23 may be included in the assembly, but may be made of metal rather than the resilient plastics material that is generally preferred.

What we claim is:

1. A center take-off rack and pinion vehicle steering assembly including a housing part, a rack bar part and a transmission bar part coaxial with said rack bar part, said rack bar part and said transmission bar part being disposed and axially slidable in said housing, steering linkage connected to said transmission bar part operable to effect vehicle steering upon axial movement of said transmission bar part, laterally extending pin means for connecting said steering linkage to said transmission bar part, a pinion coacting with the rack on said rack bar part and first means coacting between the housing and the rack bar part for urging said rack into contact with said pinion, means for rotating said pinion to effect axial movement of the transmission bar part and second means coacting between the housing and the transmission bar part including a separate bearing bush having side portions which at least straddle the transmission bar part and an intermediate portion which is located between the transmission bar part and said housing part, the bearing bush being fixed relative to either of said housing or transmission bar parts and slidable relative to the other part, said intermediate portion of the bearing bush carrying a flat face which opposes and is substantially in face-to-face contact with a second flat face carried on the transmission bar part and relative to which the bearing bush is slidable, said flat faces co-operating to resist turning movement of the transmission bar part and rack bar in the housing part.

2. A rack and pinion assembly as claimed in claim 1 in which the bearing bush is fixed relative to the transmission bar part and the second flat face is carried by the housing part, and wherein the bearing bush is located on substantially the same lateral portion of the transmission bar part that carries the laterally extending pin means.

3. A rack and pinion assembly as claimed in claim 1 in which the bearing bush is fixed relative to the housing part so that the transmission bar part which carries the second flat face is slidable through the bearing bush, and wherein said bearing bush is located adjacent substantially the same lateral portion of the transmission bar part that carries the laterally extending pin means.

4. A rack and pinion assembly as claimed in claim 3 in which the location of the bearing bush on the housing part is such that substantially the same lateral portion of the transmission bar part that carries the laterally extending pin means is straddled by the bearing bush when the pinion is located substantially centrally in the longitudinal direction of the toothed rack.

5. A rack and pinion assembly as claimed in claim 1 in which the laterally extending pin means provided on the transmission bar part project from the latter on a side thereof substantially opposite that side on or adjacent to which the two flat faces are in substantially face-to-face contact.

6. A rack and pinion assembly as claimed in claim 1 in which a lateral cross-section through the part of the assembly that carries the second flat face and including the second flat face, is substantially "D"-shaped with the second flat face comprising the substantially planar back of the "D."

7. A rack and pinion assembly as claimed in claim 6 in which a lateral cross-section through the part of the assembly to which the bearing bush is fixed and including a portion on which the bush is located is also substantially "D"-shaped and wherein the respective substantially planar backs of the "D"s are in substantially opposed face-to-face relationship with the intermediate portion of the bearing bush located therebetween.

8. A rack and pinion assembly as claimed in claim 1 in which the bearing bush is formed of a plastics material.

9. A rack and pinion assembly as claimed in claim 8 in which the bearing bush is formed of a polyurethane.

10. A center take-off rack and pinion assembly including a rack bar part and a transmission bar part coaxial and integral with said rack bar part, said rack bar part and said transmission bar part being disposed and slidable in a housing part, a pinion coacting with the rack on said rack bar part and means coacting between said housing and said rack bar part for urging said rack into contact with said pinion, pin means laterally extending from said transmission bar part and wherein a portion of the transmission bar part on the side of the laterally extending pin means remote from the pinion is provided with a first flat face, an opposed second flat face carried by said housing part and in substantially face-to-face contact with the first flat face and which co-operates in longitudinally sliding engagement with the first flat face to resist turning movement of the transmission bar part and rack bar in the housing part.

11. A center take-off rack and pinion steering assembly for a vehicle having ground engaging wheels including a housing part, a rack bar part, and a transmission bar part coaxial with said rack bar part, said rack bar part and said transmission bar part being disposed in and axially movable in said housing part, steering linkage connected to said transmission bar part operable to effect vehicle steering upon axial movement of said transmission bar part, said steering linkage being at least in part laterally spaced from said transmission bar part, means for connecting said steering linkage to said transmission bar part, a pinion coacting with the rack on said rack bar part and first means coacting between the housing and the rack bar part for urging said rack bar part into contact with said pinion, first means for rotating said pinion to effect axial movement of the transmission bar part, and second means coacting between the transmission bar part and said housing part to resist turning movement of said transmission bar part and rack bar part about the longitudinal axis of the rack bar part in response to reaction from a road wheel.

12. A rack and pinion assembly as claimed in claim 11 wherein said second means comprises relatively flat faces, one of which flat faces is associated with the transmission bar part and the other of which is associated with the housing part.

13. A center take-off rack and pinion vehicle steering assembly including a housing part, a rack bar part and a transmission bar part coaxial with said rack bar part, said rack bar part and said transmission bar part being disposed and axially slidable in said housing, steering linkage connected to said transmission bar part operable to effect vehicle steering upon axial movement of said transmission bar part, a pinion coacting with the rack on said rack bar part and means for urging said rack into contact with said pinion, means for rotating said pinion to effect axial movement of the transmission bar part and a separate bearing bush having side portions which at least straddle the transmission bar part and an intermediate portion which is located between the transmission bar part and said housing part, the bearing bush being fixed to either of said housing or transmission bar parts and slidable relative to the other part, said intermediate portion of the bearing bush carrying a flat face which opposes and is substantially in face-to-face contact with a second flat face carried on the transmission bar part and relative to which the bearing bush is slidable, and in which the bearing bush carries a first slipper member on which is formed said first flat face, said slipper member being fixed relative to the bush and located between the bush and said second flat face, said flat faces co-operating to resist turning movement of the transmission bar part and rack bar in the housing part.

14. A center take-off rack and pinion vehicle steering assembly including a housing part, a rack bar part and a transmission bar part coaxial with said rack bar part, said rack bar part and said transmission bar part being disposed and axially slidable in said housing, steering linkage connected to said transmission bar part operable to effect vehicle steering upon axial movement of said transmission bar part, a pinion coacting with the rack on said rack bar part and means for urging said rack into contact with said pinion, means for rotating said pinion to effect axial movement of the transmission bar part and a separate bearing bush having side portions which at least straddle the transmission bar part and an intermediate portion which is located between the transmission bar part and said housing part, the bearing bush being fixed to either of said housing or transmission bar parts and slidable relative to the other part, said intermediate portion of the bearing bush carrying a flat face which opposes and is substantially in face-to-face contact with a second flat face carried on the transmission bar part and relative to which the bearing bush is slidable, and in which the part of the assembly relative to which the bearing bush is slidable carries a slipper member on which is formed said second flat face, said slipper member being fixed relative to the said part and located between the bush and said first flat face, said flat faces co-operating to resist turning movement of the transmission bar part and rack bar in the housing part.

* * * * *